(12) United States Patent
Hirata et al.

(10) Patent No.: US 7,947,635 B2
(45) Date of Patent: May 24, 2011

(54) HYDRODYNAMIC BEARING DEVICE AND SPINDLE MOTOR USING THE SAME

(75) Inventors: Katsushi Hirata, Ozu (JP); Takanori Shiraishi, Ozu (JP); Hideaki Ohno, Sennan (JP)

(73) Assignee: Panasonic Corporation, Osaka (JP)

( * ) Notice: Subject to any disclaimer, the term of this patent is extended or adjusted under 35 U.S.C. 154(b) by 21 days.

(21) Appl. No.: 12/534,914

(22) Filed: Aug. 4, 2009

(65) Prior Publication Data

US 2009/0290821 A1    Nov. 26, 2009

Related U.S. Application Data

(62) Division of application No. 11/092,186, filed on Mar. 29, 2005, now abandoned.

(30) Foreign Application Priority Data

Mar. 31, 2004 (JP) ................. 2004-106272
Apr. 1, 2004 (JP) ................. 2004-109250

(51) Int. Cl.
*C10M 105/38* (2006.01)
*C10M 169/04* (2006.01)
*F16C 32/06* (2006.01)

(52) U.S. Cl. ......... 508/485; 508/110; 384/100; 384/107

(58) Field of Classification Search .................. 508/485, 508/110; 384/100, 107
See application file for complete search history.

(56) References Cited

U.S. PATENT DOCUMENTS

| 2,766,266 A | 10/1956 | Emerson et al. |
| 4,113,642 A | 9/1978 | Koch et al. |
| 5,629,274 A | 5/1997 | Hayakawa et al. |
| 6,010,246 A | 1/2000 | Gomyo et al. |
| 6,023,114 A | 2/2000 | Mori et al. |
| 6,335,310 B1 | 1/2002 | Suekuni et al. |
| 6,409,389 B1 | 6/2002 | Kadokura et al. |
| 6,617,289 B2 | 9/2003 | Memita et al. |
| 6,756,346 B1 | 6/2004 | Baba et al. |
| 6,903,056 B2 | 6/2005 | Nagano et al. |
| 2004/0018595 A1 | 1/2004 | Rudolph et al. |
| 2006/0008189 A1 | 1/2006 | Hirata et al. |
| 2006/0019840 A1 | 1/2006 | Kawahara et al. |

FOREIGN PATENT DOCUMENTS

| CN | 1428407 A | 7/2003 |
| JP | 2001-316687 A | 11/2001 |
| JP | 2003-321691 A | 11/2003 |
| JP | 2004084839 A * | 3/2004 |
| WO | 2004/018595 A1 | 3/2004 |

OTHER PUBLICATIONS

Office Action Issued Mar. 28, 2008 in U.S. Appl. No. 11/092,186.
Office Action Issued Sep. 30, 2008 in U.S. Appl. No. 11/092,186.
Office Action Issued Feb. 2, 2009 in U.S. Appl. No. 11/092,186.
Office Action Issued Nov. 27, 2009 in U.S. Appl. No. 11/092,186.

* cited by examiner

*Primary Examiner* — Glenn A Caldarola
*Assistant Examiner* — Vishal Vasisth
(74) *Attorney, Agent, or Firm* — Panitch Schwarze Belisario & Nadel LLP

(57) ABSTRACT

A hydrodynamic bearing device being low in torque, low in power consumption, high in reliability and best suited for miniaturization and a spindle motor using the same.
The hydrodynamic bearing device in accordance with the present invention, dynamic pressure generation grooves being provided on at least one of a shaft or a sleeve, and a lubricant being present in a clearance where the above-mentioned shaft and the above-mentioned sleeve are opposed to each other, is characterized in that the above-mentioned lubricant contains diesters obtained from a divalent alcohol having 4 to 8 carbon atoms and having no alkyl side chain at the β position and one or more kinds of saturated monovalent fatty acids having 9 to 13 carbon atoms.

6 Claims, 2 Drawing Sheets

FIG. 3

| | | Motor current consumption | | | Rotation Starting | | Liquid level present/absent |
|---|---|---|---|---|---|---|---|
| | | 0°C | 20°C | | −20°C | −40°C | |
| Examples | 1 | 173 | 98 | | ○ | ○ | ○ |
| | 2 | 205 | 112 | | ○ | × | ○ |
| | 3 | 188 | 106 | | ○ | × | ○ |
| | 4 | 255 | 124 | | ○ | ○ | ○ |
| | 5 | 198 | 108 | | ○ | ○ | ○ |
| | 6 | 202 | 110 | | ○ | ○ | ○ |
| | 7 | 232 | 122 | | ○ | ○ | ○ |
| | 8 | 201 | 113 | | ○ | ○ | ○ |
| | 9 | 239 | 121 | | ○ | ○ | ○ |
| | 10 | 185 | 106 | | ○ | ○ | ○ |
| Comparative examples | 1 | 179 | 100 | | × | × | × |
| | 2 | 258 | 128 | | ○ | ○ | ○ |

HYDRODYNAMIC BEARING DEVICE AND SPINDLE MOTOR USING THE SAME

CROSS-REFERENCE TO RELATED APPLICATIONS

This application is a divisional of U.S. patent application Ser. No. 11/092,186, filed Mar. 29, 2005 now abandoned, the disclosure of which is incorporated herein by reference.

BACKGROUND OF THE INVENTION

The present invention relates to a dynamic-pressure type hydrodynamic bearing device and a spindle motor using the same.

A hydrodynamic bearing comprises a shaft and a sleeve for supporting the shaft, and a lubricant is filled in a clearance where the two are opposed to each other. As the shaft rotates, the lubricant is scraped up and pressure is generated by dynamic pressure generation grooves formed on the shaft or the sleeve, and the shaft is supported without making contact with the sleeve. Hence, high-speed rotation can be realized, and noise generated during rotation can be reduced.

Since spindle motors incorporating these hydrodynamic bearing devices are excellent in rotation accuracy indispensable for achieving higher recording density of media and also excellent in impact resistance and quietness, they have become the mainstream of motors for use in information equipment typified by magnetic disk apparatuses and in audiovisual equipment. For this reason, in recent years, from the viewpoint of miniaturization and energy conservation of equipment, the motor current consumption of the spindle motor, more particularly, the torque of the hydrodynamic bearing device, significantly affecting the motor current consumption, is strongly requested to be reduced.

Since the resistance torque of the hydrodynamic bearing device is proportional to the viscosity of a lubricant to be applied, the use of a lubricant having lower viscosity is effective in reducing the resistance torque.

In addition to conventional hydrodynamic bearing devices that use dioctyl sebacate (DOS), dioctyl azelate (DOZ), dioctyl adipate (DOA), etc. as lubricants, a hydrodynamic bearing device (Japanese Laid-open Patent Application 2000-336383) that uses the mixed esters of neopentyl glycol caprylate and neopentyl glycol caprate, a hydrodynamic bearing device (Japanese Laid-open Patent Application 2001-316687) that uses an ester obtained from neopentyl glycol and a monovalent fatty acid having 6 to 12 carbon atoms and/or its derivative, a hydrodynamic bearing device (Japanese Laid-open Patent Application 2002-195252) that uses a polyol ester derived from a diol component having an alkyl side chain at the β position or the β and β' positions, etc. have been proposed.

However, in these conventional examples of hydrodynamic bearing devices, although the torque can be reduced, such problems are caused that the amount of evaporation of the lubricant increases since the heat resistance of the lubricant is low, the service life of the device is shortened, and the reliability of the device cannot be obtained sufficiently. In addition, in the case that a more than necessary amount of the lubricant is applied in consideration of the amount of evaporation of the lubricant, such problems are caused that increase in torque and increase in cost are caused corresponding to the amount, and miniaturization becomes difficult since it is necessary to obtain space.

In consideration of the problems described above, the present invention is intended to provide a hydrodynamic bearing device being low in torque, low in power consumption, high in reliability and best suited for miniaturization and a spindle motor using the same by using, as the lubricant of the hydrodynamic bearing device, a lubricant containing diesters obtained from a divalent alcohol having 4 to 8 carbon atoms and having no alkyl side chain at the β position and one or more kinds of saturated monovalent fatty acids having 9 to 13 carbon atoms.

BRIEF SUMMARY OF THE INVENTION

For the purpose of solving the above-mentioned problems, the present invention has configurations described below.

A hydrodynamic bearing device in accordance with a first aspect of the present invention, dynamic pressure generation grooves being provided on at least one of a shaft and a sleeve, and a lubricant being filled in a clearance where the above-mentioned shaft and the above-mentioned sleeve are opposed to each other, is characterized in that the above-mentioned lubricant contains diesters obtained from a divalent alcohol having 4 to 8 carbon atoms and having no alkyl side chain at the β position and one or more kinds of saturated monovalent fatty acids having 9 to 13 carbon atoms, and that the above-mentioned clearance is a radial clearance of 1 to 5 μm.

The lubricant for the hydrodynamic bearing device contains diesters obtained from a divalent alcohol having 4 to 8 carbon atoms and having no alkyl side chain at the β position and one or more kinds of saturated monovalent fatty acids having 9 to 13 carbon atoms. Hence, its viscosity is low in comparison with conventional lubricants, and it is possible to realize a hydrodynamic bearing device being low in torque. In addition, the heat resistance of the lubricant is high, and the amount of evaporation can be reduced; hence, the amount of the lubricant applied to one device is reduced, and the cost can be reduced and the device can be miniaturized. With the configuration of the present invention, it is possible to realize a hydrodynamic bearing device being low in torque, low in power consumption, high in reliability and suited for miniaturization.

Furthermore, with the configuration of the present invention, it is possible to realize a hydrodynamic bearing device being low in torque and high in stiffness and having a radial clearance best suited for fully utilizing the features of the lubricant.

Still further, a hydrodynamic bearing device in accordance with a second aspect of the present invention is the above-mentioned hydrodynamic bearing device in accordance with the first aspect of the present invention, wherein the above-mentioned one or more kinds of saturated monovalent fatty acids having 9 to 13 carbon atoms are two or more kinds of saturated monovalent fatty acids having 9 to 13 carbon atoms.

By using the diesters obtained by mixing saturated fatty acids being different in the number of carbon atoms and in molecular structure as a lubricant, the low-temperature fluidity, evaporation characteristics, etc. can be further improved in comparison with the case of a single. With the configuration of the present invention, it is possible to improve the reliability of the device and to expand the usable temperature range thereof.

Still further, a hydrodynamic bearing device in accordance with a third aspect of the present invention is the above-mentioned hydrodynamic bearing device in accordance with the second aspect of the present invention, wherein at least one of the above-mentioned two or more kinds of saturated monovalent fatty acids having 9 to 13 carbon atoms is a straight-chain type saturated monovalent fatty acid.

Since the lubricant contains a straight-chain type saturated monovalent fatty acid, the lubricant has higher heat resistance than that of the case having only a branched-chain type, and the change of viscosity depending on temperature can be suppressed. With the configuration of the present invention, it is possible to improve the reliability of the hydrodynamic bearing device and to suppress the change of torque depending on temperature.

Still further, a hydrodynamic bearing device in accordance with a fourth aspect of the present invention is the above-mentioned hydrodynamic bearing device in accordance with the third aspect of the present invention, wherein the above-mentioned two or more kinds of saturated monovalent fatty acids having 9 to 13 carbon atoms are saturated monovalent fatty acids having the same number of carbon atoms.

In saturated monovalent fatty acids being different in the number of carbon atoms, any one kind of them is different significantly in characteristics, such as heat resistance and density; hence, the performance of the device may become unstable. With the configuration of the present invention, since two or more kinds of saturated monovalent fatty acids have the same number of carbon atoms, the performance of the device can be stabilized, and it is possible to realize a hydrodynamic bearing device being high in reliability.

Still further, a hydrodynamic bearing device in accordance with a fifth aspect of the present invention is the above-mentioned hydrodynamic bearing device in accordance with the first aspect of the present invention, wherein the above-mentioned divalent alcohol having 4 to 8 carbon atoms and having no alkyl side chain at the β position is 3-methyl-1,5-pentanediol, and the above-mentioned saturated monovalent fatty acid having 9 to 13 carbon atoms is a saturated monovalent fatty acid having 9 or 10 carbon atoms.

With the configuration of the present invention, the lubricant is excellent in heat resistance and low-temperature fluidity. Hence, it is possible to realize a high performance hydrodynamic bearing device being high in reliability and capable of rotation starting even in low-temperature ranges.

Still further, with the configuration of the present invention, the saturated monovalent fatty acid having 9 or 10 carbon atoms is excellent in the balance of performance as a lubricant in particular. Hence, it is best suited for a hydrodynamic bearing device being low in torque, low in power consumption and high in reliability.

Still further, a hydrodynamic bearing device in accordance with a sixth aspect of the present invention is the above-mentioned hydrodynamic bearing device in accordance with the first aspect of the present invention, wherein the number of inorganic foreign particles being included in the above-mentioned lubricant and larger than the minimum dimension of the above-mentioned clearance is 1000 or less per hydrodynamic bearing device.

With the configuration of the present invention, since foreign particles mixed in the lubricant are scarce, torque fluctuation is small, and abrupt torque increase and bearing locking are not caused. Hence, it is possible to realize a hydrodynamic bearing device being high in performance and reliability.

Still further, a spindle motor in accordance with a first aspect of the present invention has the above-mentioned hydrodynamic bearing device in accordance with the first aspect of the present invention.

With the configuration of the present invention, it is possible to realize a spindle motor being low in motor current consumption and high in performance and reliability.

Still further, a hydrodynamic bearing device in accordance with a seventh aspect of the present invention, dynamic pressure generation grooves being provided on at least one of a shaft and a sleeve, and a lubricant being present in a clearance where the above-mentioned shaft and the above-mentioned sleeve are opposed to each other, is characterized in that the above-mentioned lubricant contains esters obtained from a divalent alcohol having 4 to 8 carbon atoms and having no alkyl side chain at the β position, one or more kinds of saturated dibasic acids having 6 to 10 carbon atoms and one or more kinds of saturated monovalent fatty acids having 5 to 13 carbon atoms, and that the above-mentioned clearance is a radial clearance of 1 to 5 μm.

The lubricant for the hydrodynamic bearing device contains esters obtained from a divalent alcohol having 4 to 8 carbon atoms and having no alkyl side chain at the β position, one or more kinds of saturated dibasic acids having 6 to 10 carbon atoms and one or more kinds of saturated monovalent fatty acids having 5 to 13 carbon atoms. Hence, its viscosity is low in comparison with conventional lubricants, and it is possible to realize a hydrodynamic bearing device being low in torque. In addition, the heat resistance of the lubricant is high, and the amount of evaporation can be reduced; hence, the amount of the lubricant applied to one device is reduced, and the cost can be reduced and the device can be miniaturized. With the configuration of the present invention, it is possible to realize a hydrodynamic bearing device being low in torque, low in power consumption, high in reliability and suited for miniaturization.

Furthermore, with the configuration of the present invention, it is possible to realize a hydrodynamic bearing device being low in torque and high in stiffness and having a radial clearance best suited for fully utilizing the features of the lubricant.

Still further, a hydrodynamic bearing device in accordance with an eighth aspect of the present invention is the above-mentioned hydrodynamic bearing device in accordance with the seventh aspect of the present invention, wherein the above-mentioned one or more kinds of saturated monovalent fatty acids having 5 to 13 carbon atoms are two or more kinds of saturated monovalent fatty acids having 5 to 13 carbon atoms.

With the configuration of the present invention, by using the esters obtained by mixing saturated fatty acids being different in the number of carbon atoms and in molecular structure as a lubricant, the low-temperature fluidity, evaporation characteristics, etc. can be further improved in comparison with the case of a single. With the configuration of the present invention, it is possible to improve the reliability of the device and to expand the usable temperature range thereof.

Still further, a hydrodynamic bearing device in accordance with a ninth aspect of the present invention is the above-mentioned hydrodynamic bearing device in accordance with the eighth aspect of the present invention, wherein at least one of the above-mentioned two or more kinds of saturated monovalent fatty acids having 5 to 13 carbon atoms is a straight-chain type saturated monovalent fatty acid.

Since the lubricant contains a straight-chain type saturated monovalent fatty acid, the lubricant has higher heat resistance than that of the case having only a branched-chain type, and the change of viscosity depending on temperature can be suppressed. With the configuration of the present invention, it is possible to improve the reliability of the hydrodynamic bearing device and to suppress the change of torque depending on temperature.

Still further, a hydrodynamic bearing device in accordance with a $10^{th}$ aspect of the present invention is the above-mentioned hydrodynamic bearing device in accordance with the ninth aspect of the present invention, wherein the above-mentioned two or more kinds of saturated monovalent fatty acids having 5 to 13 carbon atoms are saturated monovalent fatty acids having the same number of carbon atoms.

In saturated monovalent fatty acids being different in the number of carbon atoms, any one kind of them is different significantly in characteristics, such as heat resistance and density; hence, the performance of the device may become unstable. With the configuration of the present invention, since two or more kinds of saturated monovalent fatty acids have the same number of carbon atoms, the performance of the device can be stabilized, and it is possible to realize a hydrodynamic bearing device being high in reliability.

Still further, a hydrodynamic bearing device in accordance with an $11^{th}$ aspect of the present invention is the above-mentioned hydrodynamic bearing device in accordance with the seventh aspect of the present invention, wherein the above-mentioned divalent alcohol having 4 to 8 carbon atoms and having no alkyl side chain at the β position is 3-methyl-1,5-pentanediol, and the above-mentioned saturated monovalent fatty acid having 5 to 13 carbon atoms is a saturated monovalent fatty acid having 7 to 10 carbon atoms.

With the configuration of the present invention, the lubricant is excellent in heat resistance and low-temperature fluidity. Hence, it is possible to realize a high performance hydrodynamic bearing device being high in reliability and capable of rotation starting even in low-temperature ranges.

Still further, with the configuration of the present invention, the saturated monovalent fatty acid having 7 to 10 carbon atoms is excellent in the balance of performance as a lubricant in particular. Hence, it is best suited for a hydrodynamic bearing device being low in torque, low in power consumption and high in reliability.

Still further, a hydrodynamic bearing device in accordance with a $12^{th}$ aspect of the present invention is the above-mentioned hydrodynamic bearing device in accordance with the seventh aspect of the present invention, wherein the number of inorganic foreign particles being included in the above-mentioned lubricant and larger than the minimum dimension of the above-mentioned clearance is 1000 or less per hydrodynamic bearing device.

With the configuration of the present invention, since foreign particles mixed in the lubricant are scarce, torque fluctuation is small, and abrupt torque increase and bearing locking are not caused. Hence, it is possible to realize a hydrodynamic bearing device being high in performance and reliability.

Still further, a spindle motor in accordance with a second aspect of the present invention has the above-mentioned hydrodynamic bearing device in accordance with the seventh aspect of the present invention.

With the configuration of the present invention, it is possible to realize a spindle motor being low in motor current consumption and high in performance and reliability.

As the hydrodynamic bearing device and the spindle motor using the same in accordance with the present invention, it is possible to realize a hydrodynamic bearing device being low in torque, low in power consumption, high in reliability and suited for miniaturization and a spindle motor using the same by using a lubricant being low in viscosity and excellent in heat resistance.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 3 is a table showing data measurement results for Examples 1 to 10 and Comparative examples 1 and 2.

It will be recognized that some or all of the figures are schematic representations for purposes of illustration and do not necessarily depict the actual relative sizes or locations of the elements shown.

DETAILED DESCRIPTION OF THE INVENTION

Preferred Embodiments 1 to 3 of a hydrodynamic bearing device and a spindle motor using the same in accordance with the present invention will be described below.

Embodiment 1

Embodiment 1 of the present invention will be described with reference to FIG. 2.

Figure 2:
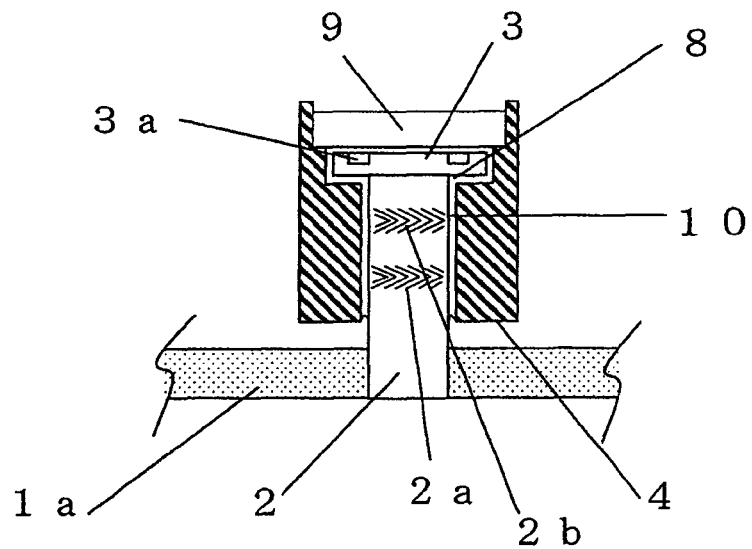
FIG. 2 is a cross-sectional view showing a shaft-fixed type hydrodynamic bearing device in accordance with Embodiment 1 of the present invention.

FIG. 2 is a schematic cross-sectional view showing a shaft-fixed type hydrodynamic bearing device. In FIG. 2, a base 1a, a shaft 2, radial dynamic pressure generation grooves 2a and 2b, a thrust flange 3, a thrust dynamic pressure generation groove 3a, a sleeve 4, a lubricant 8, a thrust plate 9 and a radial clearance 10 are shown.

The thrust flange 3 is fixed at one end of the shaft 2, on the outer peripheral surface of which the radial dynamic pressure generation grooves 2a and 2b being herringbone-shaped are formed, whereby a shaft section is formed. The other end of the shaft 2 is press-fitted in and fixed to the base 1a. The shaft section is inserted into the bearing hole of the sleeve 4, and the thrust plate 9 is installed in the sleeve 4 so as to be opposed to the thrust flange 3 and to block one side of the bearing hole. In addition, the thrust dynamic pressure generation groove 3a of spiral-shape is formed on the surface of the thrust flange 3 which is opposed to the thrust plate 9. The clearance between the bearing hole and the shaft section is filled with the lubricant 8. As rotation is carried out, the lubricant 8 is scraped up by the radial dynamic pressure generation grooves 2a and 2b formed on the shaft 2, and pressure is generated in the radial clearance 10 between the shaft 2 and the sleeve 4. Thereby the sleeve 4 is supported so as not to make contact with the shaft 2 in the radial direction. Furthermore, in the thrust direction, the lubricant 8 is scraped up by the thrust dynamic pressure generation groove 3a, and pressure is generated. Thereby the thrust plate 9 is floated and supported without making contact with the thrust flange 3.

A diester obtained from a divalent alcohol having 4 to 8 carbon atoms and having no alkyl side chain at the β position and a saturated monovalent fatty acid having 9 to 13 carbon atoms is used as the lubricant 8. As a result, the lubricant can be used for long time rotation at low torque in comparison with conventional lubricants. The synthesis of this diester can be carried out by subjecting a predetermined alcohol component and a predetermined acid component to a known esterification reaction in the presence or absence of a catalyst.

The alcohol component is a divalent alcohol having 4 to 8 carbon atoms and having no alkyl side chain at the β position. A straight-chain type or a branched-chain type having side chains at positions other than the β position is taken as an example of this divalent alcohol. However, a branched-chain type having side chains at positions other than the β position is preferable because it is excellent in low-temperature fluidity. Furthermore, a type having one alkyl side chain at each of the α, γ and δ positions is preferable because it is excellent in heat resistance. As the alkyl side chain, a lower alkyl group, such as a methyl group, an ethyl group or a propyl group, is preferable, and the methyl group is more preferable because it provides lower viscosity and can reduce the torque of the bearing. More specifically, 1-methyl-1,3-propanediol, 1-methyl-1,4-butanediol, 1-methyl-1,5-pentanediol, 1-methyl-1,6-hexanediol, 1-methyl-1,7-heptanediol, 3-methyl-1,5-pentanediol, 3-methyl-1,6-hexanediol, 3-methyl-1,7-heptanediol, 4-methyl-1,7-heptanediol, etc. are taken as examples. However, 3-methyl-1,5-pentanediol is particularly preferable because it is excellent in heat resistance and improves the reliability of the bearing.

Since the saturated monovalent fatty acid having 9 to 13 carbon atoms, serving as an acid component, does not contain unsaturated bonds, it is high in thermal and oxidation stability. Thereby it is hardly degraded even in high-temperature environment and during high-speed rotation. Hence, because of the reason that the service life of the device is extended, the acid is preferable to unsaturated monovalent fatty acids. In this case, only one kind or two or more kinds of saturated monovalent fatty acids having 9 to 13 carbon atoms may also be used. In the case that two or more kinds are used, combinations, such as a combination of a straight-chain type and a branched-chain type, having the same number of carbon atoms; a combination of branched-chain types having the same number of carbon atoms and having different branch positions; a combination of straight-chain types having different numbers of carbon atoms; a combination of a straight-chain type and a branched-chain type, having different numbers of carbon atoms; and a combination of branched-chain types having different numbers of carbon atoms, can be taken as examples. It is more preferable that at least one or more kinds of straight-chain types being excellent in heat resistance and capable of improving the reliability of the device should be used. Diesters obtained from one kind of alcohol component and two kinds of acid components are three kinds of diester mixtures in total, that is, two kinds of diesters having a single structure wherein only one kind of acid component is bonded in one molecule, and one kind of diester having a mixed structure wherein two kinds of acid components are bonded in one molecule. In addition, in the case that the number of carbon atoms is 8 or less, the bearing has lower torque, but heat resistance is low and the amount of evaporation tends to increase; hence, it is necessary to increase the amount of the lubricant to be applied, thereby being disadvantageous in cost and miniaturization. On the other hand, in the case that the number of carbon atoms is 14 or more, the viscosity increases, the effect of decreasing the torque of the bearing cannot be expected, and the low-temperature fluidity tends to become inferior, whereby rotation starting cannot be carried out in low-temperature ranges. To be more specific, these are n-nonanoic acid, n-decanoic acid, n-undecanoic acid, n-dodecanoic acid, n-tridecanoic acid, isononanoic acid, 3,5,5-trimethylhexanoic acid, isodecanoic acid, isoundecanoic acid, isodecanoic acid, isotridecanoic acid, etc. Among saturated monovalent fatty acids having 9 to 13 carbon atoms, saturated monovalent fatty acids having 9 to 10 carbon atoms are more preferable. Since n-nonanoic acid and n-decanoic acid, straight-chain types having 9 to 10 carbon atoms, are excellent in heat resistance and low viscosity, they are effective in improving the reliability of the bearing and in decreasing the torque. Furthermore, since isononanoic acid, 3,5,5-trimethylhexanoic acid and isodecanoic acid, branched-chain types having 9 to 10 carbon atoms, are excellent in heat resistance and low-temperature fluidity, they are effective in improving the reliability of the bearing and in ensuring rotation starting in low-temperature ranges.

Furthermore, in the lubricant 8 in accordance with the present invention, the diester obtained from the divalent alcohol having 4 to 8 carbon atoms and having no alkyl side chain at the β position and the saturated monovalent fatty acid having 9 to 13 carbon atoms can be additionally mixed with other types of oils as oils to be added. The oils to be added can be selected appropriately in accordance with purposes, such as reduction or adjustment in viscosity, further improvement in heat resistance, addition of other performance, complement, etc. To be more specific, known compounds, such as mineral oils, polyalfa-olefins, alkyl aromatics, polyglycols, phenyl ethers, polyol esters, dibasic acid diesters and phosphoric esters, are taken as examples. It is possible to mix one or two or more kinds of these oils to be added. Among these, polyol esters and dibasic acid diesters are high in heat resistance and excellent in low-temperature fluidity, thereby being effective in improving the reliability of the bearing device and in ensuring rotation starting in low-temperature ranges. As polyol esters, esters of fatty acids and neopentyl glycol, trimethylolpropane and pentaerythritol are taken as examples; and as dibasic acid diesters, dioctyl sebacate (DOS), dioctyl azelate (DOZ), dioctyl adipate (DOA), diisononyl adipate, di-isodecyl adipate are taken as examples.

Furthermore, in addition to these, additives can be blended with the lubricant 8. As the additives, known compounds can be selected for the purpose of improving and complementing the performance of the base oil. Specifically speaking, it is possible to blend one or two or more kinds of additives, such as an oxidation inhibitor, a rust preventive, a metal deactivator, an oiliness improver, an extreme pressure additive, a friction modifier, an anti-wear agent, a viscosity index improver, a pour point depressant, an antifoamer, an electric conductive agent and a detergent dispersant. As the additives are degraded, they may generate gasses or may deteriorate, resulting in lowering the performance of the bearing and the device; hence, the total blending quantity should be limited to the minimum necessary.

In particular, an oxidation inhibitor is indispensable for improving the long-time reliability of the hydrodynamic bearing device. To be more specific, a phenol-based oxidation inhibitor or an amine-based oxidation inhibitor, not containing sulfur or chlorine in molecules, is best suited for the hydrodynamic bearing device. In the case that an additive containing sulfur and chlorine in molecules is decomposed, corrosive gases are generated, thereby causing a risk of significantly affecting the performance of the device. These oxidation inhibitors are used alone or in combination. Among these, a phenol-based oxidation inhibitor containing two or more phenol groups and having high heat resistance, the effect of which can be delivered and maintained sufficiently even when used for the device in a high-temperature environment of 80 to 100° C. or more, is preferable. In addition, it is preferable that a liquid-type oxidation inhibitor capable of facilitating the rotation starting of the device without lowering the fluidity at a low temperature should be selected and used.

Furthermore, in the case of the lubricant 8 in accordance with the present invention, having low viscosity and a thin surface protection adsorption layer, friction and wear owing to the contact between the shaft and the sleeve at the time of the starting and stopping of the hydrodynamic bearing device may increase occasionally in comparison with the conventional examples. For this reason, it is most preferable that at least one of a metal deactivator and an oiliness improver not containing sulfur or chlorine in molecules, which is likely to form layers on the metal surfaces of the shaft and the sleeve, should be added as an additive in addition to the above-mentioned oxidation inhibitor. More specifically, a benzotriazole-based compound is recommended as a metal deactivator not containing sulfur or chlorine in molecules, and n-tetradecanoic acid, n-hexadecanoic acid, n-octadecanoic acid, etc., each serving as a monovalent fatty acid having 14 or more carbon atoms, is recommended as an oiliness improver.

Moreover, general-purpose metal salts known as various additives may react with carboxylic acid obtained when esters in the lubricant are decomposed by heat generation owing to friction and wear caused by the contact between the shaft and the sleeve at the time of the starting and stopping of the hydrodynamic bearing device, and carboxylate may be formed occasionally as a precipitate. It is thus desirable not to use them.

In addition, with respect to the viscosity of the lubricant 8, in the case that the configuration of the bearing is the same, the motor current consumption is larger as the viscosity of the lubricant is higher, and the motor current consumption is larger as the rotation speed of the motor is higher. Hence, the viscosity of the lubricant 8 should be lower. However, in the case that the viscosity of the lubricant 8 is low, for the purpose of maintaining the stiffness of the shaft, it is necessary to reduce the radial clearance 10, and there is a high possibility of causing rotation locking of the bearing owing to foreign particles or the like; hence the reliability of the device is lowered. Therefore, the effect of the lubricant in accordance with the present invention can be used to the maximum extent in the case that the viscosity of the lubricant 8 is 5 to 35 mPa·s, more preferably 5 to 30 mPa·s, in particular 10 to 25 mPa·s at 20° C. In addition, as the rotation speed of the motor, 4200 rpm, 5400 rpm, 7200 rpm, 10000 rpm, 15000 rpm, etc. are used generally.

Furthermore, in the case that the radial clearance 10 between the shaft 2 and the sleeve 4 is 1 to 5 μm, preferably 1.5 to 4 μm, more preferably 1.5 to 3 μm, the bearing can sufficiently deliver the effect of reducing the viscosity of the lubricant 8 in accordance with the present invention. Since the torque is proportional to the reciprocal of the clearance and the stiffness is proportional to the reciprocal of the clearance raised to the nth power, a clearance matching to the viscosity of the lubricant is required. In the case that the lubricant in accordance with the present invention is used in the above-mentioned ranges, low torque and stiffness required for the bearing can be obtained easily. Since the lubricant in accordance with the present invention has low viscosity, in the case of obtaining the shaft stiffness equivalent to that obtained when a conventional lubricant is used at a high temperature, it is necessary to make the radial clearance slightly smaller than conventional clearances. However, if the radial clearance is less than 1 μm, the influence of the clearance becomes significant, and the effect of reducing the torque of the bearing becomes small even if the lubricant 8 in accordance with the present invention is used. Furthermore, owing to the influence of foreign particles mixed and wear particles generated at the time of starting and stopping, bearing locking is apt to occur very frequently, and the reliability of the device is thus lowered. Moreover, higher machining accuracy and assembling accuracy are required for the shaft and the sleeve, thereby causing cost increase. In addition, if the radial clearance is more than 5 μm, although the effect of reducing the viscosity of the lubricant 8 being used in the present invention is utilized, the influence of the clearance becomes significant, and the stiffness of the bearing lowers; hence, the bearing becomes unbearable for practical use. Furthermore, since the eccentricity of the shaft increases, wobbling on the rotation face of a magnetic disk or the like serving as a recording medium mounted on the spindle motor increases; hence, the accuracy of the recording/reproduction positions lowers, signal intensity fluctuates, and the performance of a magnetic disk apparatus cannot be satisfied. Still further, since the area of the lubricant making contact with the air becomes larger, oxidation and degradation of the lubricant are accelerated, and the service life of the bearing is shortened, thereby resulting in an improper state.

In addition, it is preferable that the diameter of the shaft 2 should be 1 to 4 mm. In the case that the diameter of the shaft is less than 1 mm, the clearance must be made significantly smaller and the shaft must be made longer for the purpose of obtaining the stiffness of the bearing. However, if the clearance is made smaller, the above-mentioned problems occur; the length of the shaft is limited strictly for miniaturization, and the performance required cannot be satisfied. Furthermore, in the case that the diameter of the shaft is more than 4 mm, the stiffness increases, but torque loss becomes large, whereby the effect of the lubricant 8 cannot be delivered. The effect of the lubricant in accordance with the present invention can be utilized to the maximum extent in the case that the diameter is preferably 1.5 to 3.5 mm, more preferably 1.5 to 3 mm, in consideration of the combination with the radial clearance 10.

Stainless steel is best suited as the material of the shaft 2. In comparison with other metals, stainless steel being used for the shaft is less corroded by acids or the like generated at the time when the ester of the lubricant 8 is synthesized, and is high in hardness, and the amount of wear can be restricted; hence, stainless steel is effective in the case of using the lubricant 8 in accordance with the present invention having low viscosity and a thin surface protection adsorption layer. Martensitic stainless steel is used more preferably.

Furthermore, the lubricant 8 in accordance with the present invention is filtered so that the number of inorganic foreign particles being mixed and larger than the radial clearance 10, the minimum clearance where the shaft 2 and the sleeve 4 are opposed to each other, is 1000 or less per bearing device, and then the lubricant is applied to the bearing. These inorganic foreign particles are fine particles including elements, such as iron, chromium, copper, aluminum and silicon, generated from the materials of the components of the spindle motor, jigs used in processes, substances suspended in the air. These inorganic foreign particles not only cause torque increase and fluctuation but also adhere to the shaft and the sleeve, and may cause bearing locking; hence they should be as few as possible. The filtering of the lubricant is carried out under increased or reduced pressure using a filter having pores with a diameter not larger than the dimension of the minimum radial clearance. A method, wherein the lubricant having been subjected to the above-mentioned filtering is further filtered using a filter having pores with a diameter not larger than the dimension of the minimum radial clearance, and the inorganic foreign particles larger than the dimension of the radial clearance 10 on the filter are counted using an optical or electron microscope, or a similar method, is used to count the number of the foreign particles. On the basis of the amount of the lubricant subjected to the filtering and the number of the inorganic foreign particles larger than the dimension of the radial clearance 10, the number of the foreign particles per the amount of the lubricant applied to one bearing device is obtained by conversion. Other than these, organic foreign particles, such as fibers, are present. However, since such organic foreign particles are soft, they are less likely to cause bearing locking than the inorganic foreign particles.

It is preferable that the sleeve 4 is made of a material, such as copper alloy, iron alloy, stainless steel, ceramic or resin, a material being less likely to be corroded by acids. Furthermore, copper alloy, iron alloy or stainless steel is preferable in terms of wear resistance, machinability and cost. Furthermore, a sintered material may also be used in terms of cost, and a similar effect is obtained in the case that the sintered material is impregnated with the lubricant. Part or the whole of the surface of the sleeve material may be reformed using the plating method, physical vapor deposition method, chemical vapor deposition method, diffusion coating method or the like.

Although the radial dynamic pressure generation grooves are formed on the outer peripheral surface of the shaft, they may also be formed on the bearing hole face of the sleeve, or they may also be formed on both of the outer peripheral surface of the shaft and the bearing hole face of the sleeve. Furthermore, the thrust dynamic pressure generation groove may be formed only on the surface of the thrust flange being opposed to the thrust plate, or only on the surface of the thrust plate being opposed to the thrust flange, or only on the rear face of the thrust flange, or at two or more positions of the above-mentioned three positions.

Moreover, the radial and thrust dynamic pressure generation grooves have a similar effect, regardless of whether they are herringbone-shaped or spiral-shaped.

In the embodiment of the present invention, one end of the shaft section is fixed. However, a similar effect is obtained even in the case that both ends thereof are fixed and in the case that both ends of the bearing hole of the sleeve are open.

Embodiment 2

Embodiment 2 of the present invention will be described with reference to FIG. 2 again. This embodiment is similar to Embodiment 1 except for the difference in the ingredients of the lubricant 8.

The lubricant 8 differs from the lubricant 8 in accordance with Embodiment 1 in that esters obtained from a divalent alcohol having 4 to 8 carbon atoms and having no alkyl side chain at the β position, a saturated dibasic acid having 6 to 10 carbon atoms and a saturated monovalent fatty acid having 5 to 13 carbon atoms are used instead of a diester obtained from a divalent alcohol having 4 to 8 carbon atoms and having no alkyl side chain at the β position and a saturated monovalent fatty acid having 9 to 13 carbon atoms. In other respects, the lubricant 8 is similar to the lubricant 8 in accordance with Embodiment 1.

Esters obtained from a divalent alcohol having 4 to 8 carbon atoms and having no alkyl side chain at the β position, a saturated dibasic acid having 6 to 10 carbon atoms and a saturated monovalent fatty acid having 5 to 13 carbon atoms are used for the lubricant 8; hence, the lubricant can be used for long time rotation at low torque in comparison with conventional lubricants. The synthesis of the esters can be carried out by subjecting a predetermined alcohol component and predetermined acid components to a known esterification reaction in the presence or absence of a catalyst.

The alcohol component is a divalent alcohol having 4 to 8 carbon atoms and having no alkyl side chain at the β position. A straight-chain type or a branched-chain type having side chains at positions other than the β position is taken as an example of this divalent alcohol. However, a branched-chain type having side chains at positions other than the β position is preferable because it is excellent in low-temperature fluidity. Furthermore, a type having one alkyl side chain at each of the α, γ and δ positions is preferable because it is excellent in heat resistance. As the alkyl side chain, a lower alkyl group, such as a methyl group, an ethyl group or a propyl group, is preferable, and the methyl group is more preferable because it provides lower viscosity and can reduce the torque of the bearing. More specifically, 1-methyl-1,3-propanediol, 1-methyl-1,4-butanediol, 1-methyl-1,5-pentanediol, 1-methyl-1,6-hexanediol, 1-methyl-1,7-heptanediol, 3-methyl-1,5-pentanediol, 3-methyl-1,6-hexanediol, 3-methyl-1,7-heptanediol, 4-methyl-1,7-heptanediol, etc. are taken as examples. However, 3-methyl-1,5-pentanediol is particularly preferable because it is excellent in heat resistance and improves the reliability of the bearing.

The acid components thereof are a saturated dibasic acid having 6 to 10 carbon atoms and a saturated monovalent fatty acid having 5 to 13 carbon atoms.

As the saturated dibasic acid having 6 to 10 carbon atoms, adipic acid, pimelic acid, suberic acid, azelaic acid, sebacic acid, etc. are taken as examples. Among these, adipic acid, azelaic acid and sebacic acid are preferable in terms of cost; in particular, adipic acid has a lower molecular weight and is effective in reducing the torque of the bearing. If the number of carbon atoms is 5 or less, the bearing has lower torque but becomes low in heat resistance, and the amount of evaporation increases; hence, it is necessary to increase the amount of the lubricant to be applied, thereby being disadvantageous in cost and miniaturization. In the case that the number of carbon atoms is 11 or more, the viscosity increases, and it is difficult to expect the effect of reducing the torque of the bearing.

Furthermore, only one kind or two or more kinds of saturated monovalent fatty acids having 5 to 13 carbon atoms may also be used. In the case that two or more kinds are used, combinations, such as a combination of a straight-chain type and a branched-chain type, having the same number of carbon atoms; a combination of branched-chain types having the same number of carbon atoms and having different branch positions; a combination of straight-chain types having different numbers of carbon atoms; a combination of a straight-chain type and a branched-chain type, having different numbers of carbon atoms; and a combination of branched-chain types having different numbers of carbon atoms, can be taken as examples. It is more preferable that at least one or more kinds of straight-chain types being excellent in heat resistance and capable of improving the reliability of the device should be used. However, in the case that the number of carbon atoms is 4 or less, the bearing has lower torque, but heat resistance is low and the amount of evaporation tends to increase; hence, it is necessary to increase the amount of the lubricant to be applied, thereby being disadvantageous in cost and miniaturization. On the other hand, in the case that the number of carbon atoms is 14 or more, the viscosity increases, the effect of decreasing the torque of the bearing cannot be expected, and the low-temperature fluidity tends to become inferior, whereby rotation starting cannot be carried out in low-temperature ranges. Among saturated monovalent fatty acids having 5 to 13 carbon atoms, saturated monovalent fatty acids having 7 to 10 carbon atoms are more preferable. Since straight-chain types having 7 to 10 carbon atoms are excellent in heat resistance and low viscosity, they are effective in improving the reliability of the bearing and in decreasing the torque. Furthermore, since branched-chain types having 7 to 10 carbon atoms are excellent in heat resistance and low-temperature fluidity, they are effective in improving the reliability of the bearing and in ensuring rotation starting in low-temperature ranges. To be more specific, these are n-heptanoic acid, n-octanoic acid, n-nonanoic acid, n-decanoic acid, isoheptanoic acid, isooctanoic acid, 2-ethylhexanoic acid, isononanoic acid, 3,5,5-trimethylhexanoic acid, isodecanoic acid, etc.

Although the usage ratio between the saturated dibasic acid having 6 to 10 carbon atoms and the saturated monovalent fatty acid having 5 to 13 carbon atoms, serving as acid components, is not restricted, it is preferable that the ratio of the saturated monovalent fatty acid having 5 to 13 carbon atoms should be larger to have higher heat resistance and to improve the reliability of the bearing. The ratio in this case is assumed to be a mole ratio in the case that the whole of the acid components is regarded as 100. For example, in the case that the numbers of moles of the saturated dibasic acid having 6 to 10 carbon atoms and the saturated monovalent fatty acid having 5 to 13 carbon atoms, serving as acid components, are the same, it is assumed that the mole ratio is 50:50. In particular, the mole ratio of the saturated dibasic acid having 6 to 10 carbon atoms should be 20 or less, and preferably 10 or less.

Furthermore, in the lubricant 8 in accordance with the present invention, the esters obtained from the divalent alcohol having 4 to 8 carbon atoms and having no alkyl side chain at the β position, the saturated dibasic acid having 6 to 10 carbon atoms and the saturated monovalent fatty acid having 5 to 13 carbon atoms can be additionally mixed with other types of oils as oils to be added. The oils to be added can be selected appropriately in accordance with purposes, such as reduction or adjustment in viscosity, further improvement in heat resistance, addition of other performance, complement, etc. To be more specific, known compounds, such as mineral oils, polyalfa-olefins, alkyl aromatics, polyglycols, phenyl ethers, polyol esters, dibasic acid diesters and phosphoric esters, are taken as examples. It is possible to mix one or two or more kinds of these oils to be added. Among these, polyol esters and dibasic acid diesters are high in heat resistance and excellent in low-temperature fluidity and effective in improving the reliability of the bearing device and in ensuring rotation starting in low-temperature ranges. As polyol esters, esters of fatty acids and neopentyl glycol, trimethylolpropane and pentaerythritol are taken as examples; and as dibasic acid diesters, dioctyl sebacate (DOS), dioctyl azelate (DOZ), dioctyl adipate (DOA), diisononyl adipate, di-isodecyl adipate are taken as examples.

Embodiment 3

Embodiment 3 of the present invention will be described with reference to FIG. 1.

Figure 1:
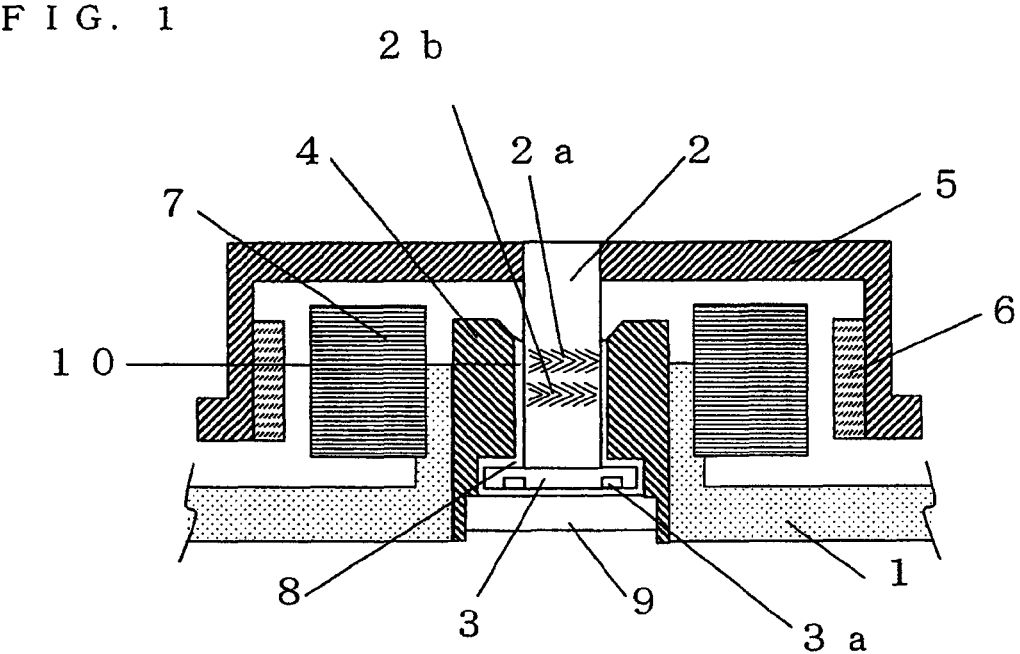
FIG. 1 is a cross-sectional view showing a spindle motor having a shaft-rotation type hydrodynamic bearing device in accordance with Embodiment 2 of the present invention.

FIG. 1 is a cross-sectional view showing a spindle motor having a shaft-rotation type hydrodynamic bearing device in accordance with Embodiment 3. The hydrodynamic bearing device in accordance with this embodiment differs from the hydrodynamic bearing device shown in FIG. 2 in that the hydrodynamic bearing device is changed from a shaft-fixed type to a shaft-rotation type, that a base 1 is provided instead of the base 1a, and that a hub 5, a rotor magnet 6 and a stator coil 7 are provided. In other respects, this embodiment is similar to Embodiment 1; components having similar or equivalent configurations are designated by the same numerals, and their detailed descriptions are omitted.

A thrust flange 3 is fixed at one end of a shaft 2, on the outer peripheral surface of which herringbone-shaped radial dynamic pressure generation grooves 2a and 2b are formed, and the hub 5, on which magnetic disks or the like are mounted, is press-fitted over the other end, whereby a rotation section is formed. On the other hand, a sleeve 4 for receiving the rotation section is press-fitted in the base 1, and a thrust plate 9 is installed at one end thereof, whereby a fixed section is formed. Furthermore, the shaft section is inserted into the bearing hole of the sleeve 4 so that the thrust plate 9 and the thrust flange 3 are opposed to each other, and a herringbone-shaped thrust dynamic pressure generation groove 3a is formed on the surface of the thrust flange 3 opposed to the thrust plate 9. A lubricant 8 is applied to the clearance between the bearing hole and the shaft section, whereby a bearing device is formed. Moreover, the stator coil 7 is provided on a wall formed on the base 1, and the rotor magnet 6 is installed on the inner peripheral surface of the hub 5 so as to be opposed to the stator coil 7, whereby a motor drive section is formed.

When the rotation section is rotated and driven by this motor drive section, dynamic pressure is generated in the lubricant 8 both in the radial and thrust directions as in the case of Embodiment 1; hence, the rotation section is rotatably supported by the fixed section without making contact with each other.

In the spindle motor, one or more aluminum or glass magnetic disks are usually mounted on the hub 5. The present invention is particularly effective for a spindle motor on which compact magnetic disks of 2.5 inches or less in size are mounted.

The lubricant for the spindle motor in accordance with the present invention and the hydrodynamic bearing device in accordance with the present invention will be described below in more detail using Examples 1 to 10 and Comparative examples 1 and 2.

In all the cases of Examples 1 to 10 and Comparative examples 1 and 2, 0.5 wt % of 4,4'-methylenebis-2,6-di-tert-butylphenol, serving as a phenol-based oxidation inhibitor containing two phenol groups, was blended as an oxidation inhibitor. The blending amount, that is, the weight % of an additive, designated in the present invention is the ratio of the additive to the total weight of the lubricant including its base oil and additives.

Furthermore, each of the lubricants is filtered beforehand under reduced pressure using a filter having pores with a diameter of 2.5 μm or less to remove foreign particles.

Example 1

A diester obtained from 3-methyl-1,5-pentanediol and n-nonanoic acid was used as a lubricant.

Example 2

A diester obtained from 3-methyl-1,5-pentanediol and n-decanoic acid was used as a lubricant.

Example 3

Diesters obtained from 3-methyl-1,5-pentanediol and n-nonanoic acid/n-decanoic acid (mole ratio 50:50) were used as a lubricant.

Example 4

A diester obtained from 3-methyl-1,5-pentanediol and 3,5,5-trimethylhexanoic acid was used as a lubricant.

Example 5

Diesters obtained from 3-methyl-1,5-pentanediol and n-nonanoic acid/3,5,5-trimethylhexanoic acid (mole ratio 60:40) were used as a lubricant.

Example 6

Esters obtained from 3-methyl-1,5-pentanediol and adipic acid/n-nonanoic acid (mole ratio 5:95) were used as a lubricant.

Example 7

Esters obtained from 3-methyl-1,5-pentanediol and sebacic acid/n-octanoic acid (mole ratio 11:89) were used as a lubricant.

Example 8

Esters obtained from 3-methyl-1,5-pentanediol and adipic acid/n-octanoic acid (mole ratio 11:89) were used as a lubricant.

Example 9

Esters obtained from 3-methyl-1,5-pentanediol and adipic acid/n-nonanoic acid/2-methylhexanoic acid (mole ratio 12:44:44) were used as a lubricant.

Example 10

Esters obtained from 3-methyl-1,5-pentanediol and adipic acid/n-octanoic acid/n-decanoic acid (mole ratio 5:57:38) were used as a lubricant.

Comparative Example 1

A polyol ester obtained from neopentyl glycol and n-nonanoic acid was used as a lubricant.

Comparative Example 2

Dioctyl sebacate (DOS) serving as a diester was used as a lubricant.

Spindle motors each provided with a hydrodynamic bearing device were formed, wherein the same predetermined amount of each of the lubricants of Examples 1 to 10 and Comparative examples 1 and 2 described above was applied, the radial clearance between the shaft and the sleeve was 2.5 µm, the shaft was 3 mm in diameter and made of martensitic stainless steel, and the sleeve was made of a copper alloy; and the current consumption of each motor at a rotation speed of 5400 rpm was measured in environments of 0° C. and 20° C.

Assuming that the motor current consumption in Comparative example 1 at 20° C. was 100, the motor current consumption in each example was represented. The results of the measurements are shown in the table of FIG. 3. In addition, after the above-mentioned spindle motors were left in environments of −20° C. and −40° C. for 5 hours, the respective spindle motors were examined as to whether rotation starting is possible or not at −20° C. and −40° C.

Furthermore, after continuous rotation of 500 hours at 100° C., the hub was removed, and the clearance between the open end of the sleeve and the shaft that the liquid level in which the lubricant was applied, was checked from above using a microscope to examine as to whether the liquid level was present or not. In the case that the liquid level of the lubricant was unable to be confirmed, it was decided that the amount of evaporation was large, that the liquid level sunk to the inside of the bearing by evaporation, that the amount of the liquid required for maintaining the performance was deficient and that the reliability was insufficient.

As clarified in the table of FIG. 3, the motor current consumption in each case of Examples 1 to 10 was reduced in comparison to Comparative example 2, and rotation starting was possible even at a very low temperature of −20° C. In Examples 1, 4 to 10, rotation starting was possible even at a very low temperature of −40° C. On the other hand, in Comparative example 1, although the motor current consumption was lower than those in some of Examples 1 to 10, rotation starting was utterly impossible at −20° C.; furthermore, no liquid level was observed and the amount of evaporation was large.

In this case, the pour point indicating the low-temperature fluidity of the lubricant in Examples 1 to 10 and Comparative examples 1 and 2 does not necessarily coincide with the temperature at which motor rotation starting is possible. This is due to a factor that the pour point measured according to JIS-K2269 or the like is different from the actual solidification temperature because, for example, environment leaving time has not been defined.

On the basis of the above, the hydrodynamic bearing device and the spindle motor in accordance with the present invention are low in torque and long in service life, and rotation starting is possible even at −20° C.

The hydrodynamic bearing device and the spindle motor using the same in accordance with the present invention can be used as a motor for magnetic disk apparatuses and optical disk apparatuses.

Although the present invention has been described with respect to its preferred embodiments in some detail, the disclosed contents of the preferred embodiments may change in the details of the structure thereof, and any changes in the combination and sequence of the component may be attained without departing from the scope and spirit of the claimed invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A hydrodynamic bearing device for use in a magnetic disk apparatus, wherein the device comprises a shaft and a sleeve, dynamic pressure generation grooves are formed on at least one of the shaft or the sleeve, and a lubricant is present in a radial clearance formed between the shaft and the sleeve when the shaft and the sleeve are opposed to each other, wherein the radial clearance is 1 to 5 µm, and wherein the lubricant comprises at least: (A) esters obtained from 3-methyl-1,5-pentanediol, at least one saturated dibasic acid having 6 to 10 carbon atoms, and at least one straight-chain type saturated monovalent fatty acid having 7 to 10 carbon atoms, wherein a number of moles of the straight-chain type saturated monovalent fatty acid is greater than a number of moles of the saturated dibasic acid, and (B) an oxidation inhibitor free of molecular sulfur and molecular chlorine.

2. The hydrodynamic bearing device according to claim 1, wherein the radial clearance is 1.5 to 3 µm.

3. The hydrodynamic bearing device according to claim 1, wherein the lubricant comprises no more than 1,000 inorganic foreign particles larger than a minimum dimension of the radial clearance.

4. The hydrodynamic bearing device according to claim 1, wherein the lubricant further comprises at least one additive selected from the group consisting of a metal deactivator free of molecular sulfur and molecular chlorine and an oiliness improver.

5. The hydrodynamic bearing device according to claim 1, wherein the sleeve comprises a material selected from the group consisting of copper alloy, iron alloy, stainless steel and a sintered material, and wherein at least a portion of a surface of the sleeve is reformed.

6. A spindle motor comprising the hydrodynamic bearing device according to claim 1.

* * * * *